US012067273B2

(12) United States Patent
Armangau et al.

(10) Patent No.: US 12,067,273 B2
(45) Date of Patent: Aug. 20, 2024

(54) FINGERPRINT-BASED DATA MOBILITY ACROSS SYSTEMS WITH HETEROGENOUS BLOCK SIZES

(71) Applicant: Dell Products L.P., Round Rock, TX (US)

(72) Inventors: Philippe Armangau, Kalispell, MT (US); Doran Tal, Geva Carmel (IL); Steven A. Morley, Mendon, MA (US)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 17/869,939

(22) Filed: Jul. 21, 2022

(65) Prior Publication Data

US 2024/0028229 A1 Jan. 25, 2024

(51) Int. Cl.
G06F 12/00 (2006.01)
G06F 3/06 (2006.01)

(52) U.S. Cl.
CPC .......... *G06F 3/064* (2013.01); *G06F 3/0604* (2013.01); *G06F 3/0644* (2013.01); *G06F 3/067* (2013.01)

(58) Field of Classification Search
CPC ...... G06F 3/064; G06F 3/0604; G06F 3/0644; G06F 3/067
See application file for complete search history.

(56) References Cited

U.S. PATENT DOCUMENTS

| | | | |
|---|---|---|---|
| 8,712,963 B1* | 4/2014 | Douglis | G06F 11/2097 707/633 |
| 8,799,601 B1 | 8/2014 | Chen et al. | |
| 9,838,494 B1* | 12/2017 | Tomasiewicz | G06F 16/9574 |
| 10,824,359 B2 | 11/2020 | Armangau et al. | |
| 11,153,385 B2 | 10/2021 | Faibish et al. | |
| 11,321,169 B2 | 5/2022 | Vankamamidi et al. | |
| 2012/0317084 A1* | 12/2012 | Liu | G06F 3/0665 707/E17.005 |
| 2013/0013880 A1* | 1/2013 | Tashiro | H03M 7/30 711/170 |
| 2017/0315875 A1* | 11/2017 | Tirupati Nagaraj | G06F 11/1451 |
| 2019/0129639 A1* | 5/2019 | Armangau | G06F 16/137 |
| 2020/0034449 A1* | 1/2020 | Gupta | G06F 16/1748 |
| 2020/0293498 A1* | 9/2020 | Vijayan | G06F 16/1744 |
| 2021/0058459 A1* | 2/2021 | Faibish | H04L 67/133 |

OTHER PUBLICATIONS

Armangau, Philippe, et al.; "Attribute-Only Reading of Specified Data," U.S. Appl. No. 17/723,533, filed Apr. 19, 2022.

* cited by examiner

*Primary Examiner* — John A Lane
(74) *Attorney, Agent, or Firm* — BainwoodHuang

(57) ABSTRACT

A technique for achieving data mobility between storage systems having different block sizes includes identifying a baseline size that is common to the block sizes of the storage systems. The technique further includes generating fingerprints of blocks based on extents having the common baseline size. Fingerprint-based data mobility is then achieved by comparing extent-based fingerprints, or combinations thereof, across different storage systems to identify matching data.

18 Claims, 6 Drawing Sheets

FINGERPRINT-BASED DATA MOBILITY ACROSS SYSTEMS WITH HETEROGENOUS BLOCK SIZES

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Many storage systems use deduplication for achieving data reduction. Deduplication is a technology that reduces the number of duplicate copies of data. A common deduplication scheme includes a digest database that associates hash values of data blocks with locations where those data blocks can be found. The hash values may have sufficient uniqueness that a match between two hash values computed from respective blocks conclusively identifies a match between the blocks themselves. When a storage system receives a new block for storage, the storage system may compute a hash value of the new block and perform a lookup for that hash value in the digest database. If a match is found, the storage system may conclude that the new block is already present and may effectuate storage of the new block by setting a pointer from a logical address of the new block to a target block pointed to by the matching entry in the database. Storage of a duplicate copy of the data of the new block is therefore avoided, and an increment of data reduction is achieved.

Some storage environments use deduplication-like techniques for achieving data mobility. For example, a source storage system may identify a set of blocks to be copied or moved to a destination storage system. Rather than sending the data of the blocks themselves, the source storage system instead sends hash values of the blocks, such as hash values used for deduplication. The destination storage system receives the hash values and determines whether the corresponding blocks are available locally. For example, the destination performs lookups for the hash values in a local digest database. For hash values that produce matches to entries in the local digest database, the destination effectuates storage of the respective blocks by creating references to local target blocks pointed to by the matching entries. The data of any blocks that are not matched may be send to the destination in a separate transmission.

SUMMARY

Sending blocks between storage systems using fingerprint matching is typically much more efficient than the brute-force approach of sending the data itself of all of the blocks to be copied or moved. Hash values of blocks are typically much smaller than the data of those blocks, so sending hash values instead of data significantly reduces network traffic and associated overhead.

Unfortunately, fingerprint-based methods for data mobility are not always available. Consider, for example, a case in which a source storage system and a destination storage system use different block sizes. Fingerprint-based methods cannot be used directly for transmitting data between the two systems. Even if a block at the destination includes all the same data as a block at the source, the hash values of the two blocks would still differ, as the block at the destination would include additional data not found in the block at the source. What is needed, therefore, is a way of achieving fingerprint-based data mobility between storage systems that use different block sizes.

To address this need at least in part, an improved technique for achieving data mobility between storage systems having different block sizes includes identifying a baseline size that is common to the block sizes of the storage systems. The technique further includes generating fingerprints of blocks based on extents having the common baseline size. Fingerprint-based data mobility is then achieved by comparing extent-based fingerprints, or combinations thereof, across different storage systems to identify matching data.

Advantageously, the improved technique enables fingerprint-based matching to proceed when sending data between storage systems having different block sizes, thereby reducing network traffic and congestion. The technique also promotes effective data management in heterogenous storage environments, as it overcomes an impediment to data mobility between systems of different block sizes.

Certain embodiments are directed to a method of managing data mobility between storage systems having respective block sizes. The method includes receiving, by a second storage system, first fingerprints calculated from a first set of blocks of a first storage system, the first set of blocks having a first block size, and matching the first fingerprints with second fingerprints calculated from a second set of blocks of the second storage system, the second set of blocks having a second block size different from the first block size. The first fingerprints and the second fingerprints are calculated from extents having a common baseline size. The method further includes effectuating storage of the first set of blocks by reference to the second set of blocks.

Other embodiments are directed to a method of managing data mobility between storage systems having respective block sizes. The method includes sending, by a first storage system to a second storage system, first fingerprints calculated from a first set of blocks of the first storage system, the first set of blocks having a first block size. The method further includes matching, by the second storage system, the first fingerprints with second fingerprints calculated from a second set of blocks of the second storage system, the second set of blocks having a second block size different from the first block size, the first fingerprints and the second fingerprints calculated from extents having a common baseline size. The method still further includes effectuating, by the second storage system, storage of the first set of blocks by reference to the second set of blocks.

Additional embodiments are directed to a computerized apparatus constructed and arranged to perform a method of managing data mobility between storage systems having respective block sizes, such as either of the methods described above. Still other embodiments are directed to a computer program product. The computer program product stores instructions which, when executed on control circuitry of a computerized apparatus, cause the computerized apparatus to perform a method of managing data mobility between storage systems having respective block sizes, such as either of the methods described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for achieving data mobility between storage systems having different block sizes includes identifying a baseline size that is common to the block sizes of the storage systems. The technique further includes generating fingerprints of blocks based on extents having the common baseline size. Fingerprint-based data mobility is then achieved by comparing extent-based fingerprints, or combinations thereof, across different storage systems to identify matching data.

Figure 1:
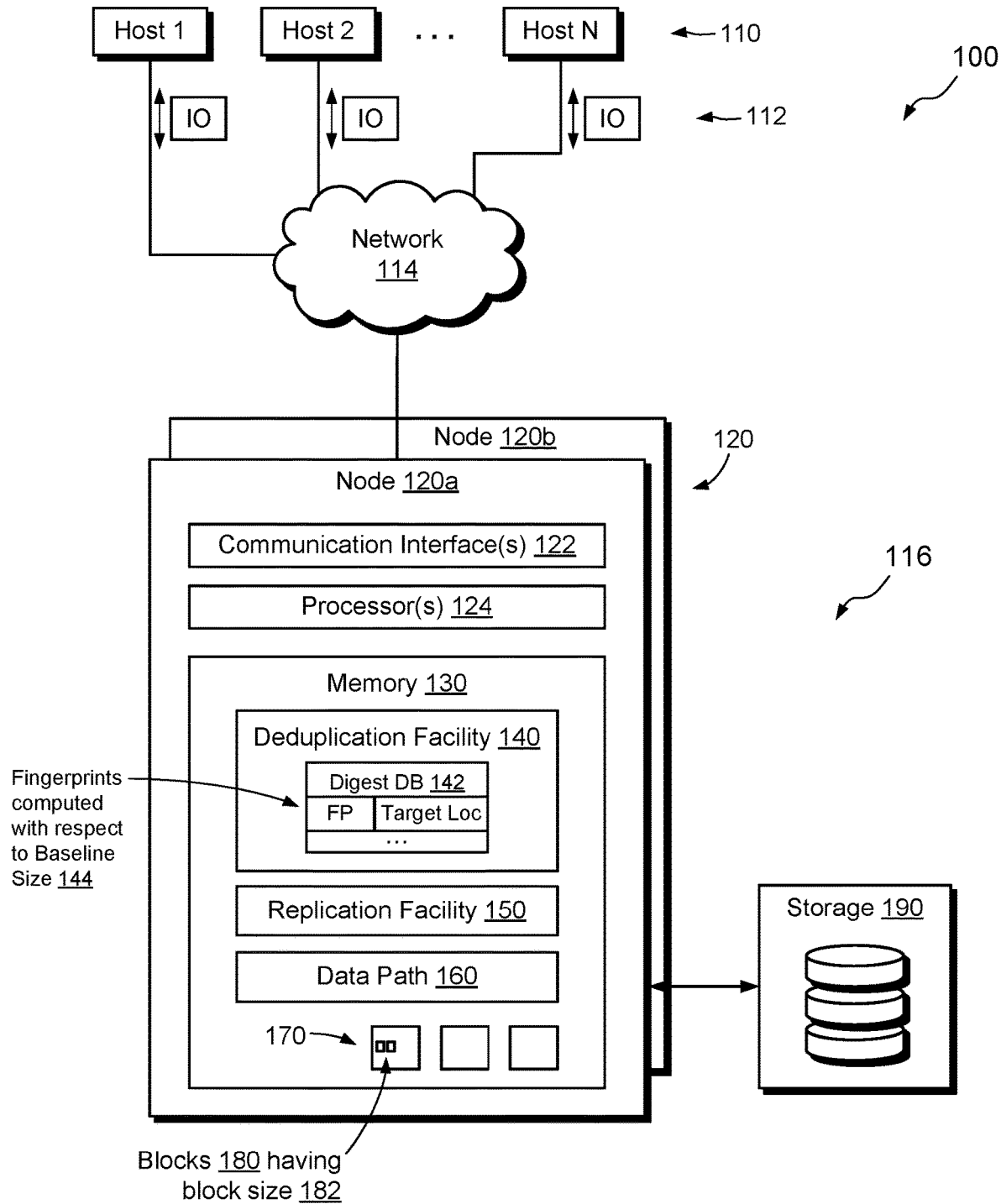
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a deduplication facility 140, a replication facility 150, a data path 160, and any number of data objects 170. The data objects 170 may be any type or types of objects, such as LUNs (Logical UNits), volumes, file systems, virtual machine disks, and/or the like. The data objects 170 may be composed of blocks 180, where a "block" is a unit of allocatable storage space. Blocks 180 in storage system 116 typically have uniform size, designated as block size 182. The data storage system 116 is configured to access the data objects 170 by specifying blocks of the data objects to be created, read, updated, or deleted.

Typical block sizes 182 may be 4 kB (kilo Bytes), 8 kB, 16 kB, 32 kB, or 64 kB, for example. Block sizes 182 may be different across different data storage systems. For example, a heterogenous storage environment may include a variety of storage systems having respective block sizes.

Deduplication facility 140 is configured to perform data deduplication based on fingerprints. Deduplication may be performed inline or near-inline, using fingerprint-based matching in which duplicate copies are avoided prior to being written to persistent data-object structures. In some examples, deduplication may also be performed in the background, i.e., out of band with the initial processing of incoming writes. Deduplication may also be referred to herein as "dedupe." In some examples, the deduplication facility 140 includes or otherwise has access to a digest database 142, which associates fingerprints of data blocks 180 with respective locations of those data blocks in the storage system 116.

Replication facility 150 is configured to perform replication on data objects 170. Typically, replication is carried out between two data storage systems, with one storage system designated as a "source" and the other storage system designated as a "destination." The source is generally the data storage system that "hosts" a data object, i.e., makes the data object available to hosts 110 for reading and/or writing, whereas the destination is generally the data storage system that maintains a "replica" of the data object, i.e., a copy of the data object that is current or nearly current.

In an example, replication facility 150 is configured to perform asynchronous replication, also known as "snapshot shipping." Asynchronous replication works by taking regular snapshots of a data object 170 on a specified schedule, such as once every five minutes, once every hour, or at some other rate, which is typically defined by an administrator. Each time a new snapshot of the data object is taken, the replication facility 150 computes a new deltaset, i.e., a set of changes or differences between blocks of the new snapshot and blocks of the immediately previous snapshot. The replication facility 150 then transmits ("ships") the deltaset to the destination, which applies the deltaset in updating the replica. Once the update is complete, the contents of the replica are identical to those of the data object as of the most recent snapshot taken at the source.

Replication as described herein may leverage fingerprint-based block matching. For example, to replicate a data block 180 of a data object 170 from the data storage system 116 acting as a source to another data storage system acting as a destination, the data storage system 116 may send a fingerprint calculated from the data block along with an LBA (logical block address) of the data block in the data object 170. The data of the data block itself is not sent, however. Upon receiving the fingerprint and the LBA, the destination may use the fingerprint to perform inline deduplication, attempting to use the fingerprint to identify a matching target block already stored at the destination. If a match is found, the destination may update a replica of the data object to point to the target block at the indicated LBA. If no matching block can be found, then the destination may request and obtain the missing data block from the source.

Data path 160 is configured to provide metadata for accessing data objects 170. As described in more detail below, data path 160 may include various logical blocks, mapping pointers, and block virtualization structures, some of which may track various attributes of blocks which are useful for fingerprint-based block matching.

In accordance with improvements hereof, at least some of the fingerprints of the digest database 142 are calculated with respect to a baseline size 144, which is used across all storage systems with which fingerprint-based data mobility is desired. For example, if the data storage system 116 is one of two storage systems between which data mobility is desired, then the baseline size 114 may be selected as the smallest block size 182 of the two systems. If one storage system has a block size of 4 kB and the other has a block size of 8 kB, for example, then the baseline size 144 may be set to 4 kB.

To support fingerprint-based matching between the two storage systems, both storage systems calculate fingerprints based on extents of blocks, where the extents have the baseline size 144. In the example above, one storage system may calculate a fingerprint for an 8-kB block by rendering the 8-kB block as two 4-kB extents, computing respective hashes of the two 4-kB extents, and combining the two hashes (according to a function). On the other storage system, a fingerprint may be computed from a pair of 4-kB blocks. For example, the storage system computes respective hashes of two 4-kB blocks (extents) and combines the two hashes, using the same function as described above. In this manner, the 8-kB block on one system can be matched with a pair of 4-kB blocks on the other system by comparing the two fingerprints.

Similar principles apply for other block sizes. For example, 8-kB blocks can be matched with 64-kB blocks by grouping together eight 8-kB blocks, computing a hash of each of the 8-kB blocks, and combining the hashes to produce a single fingerprint representing all eight blocks. A fingerprint of a 64-kB block may likewise be computed by rendering the 64-kB block as eight 8-kB extents, computing respective hashes of the extents, and combining the hashes. The two resulting fingerprints can then be compared directly.

Although the examples above assume that data mobility is desired among only two storage systems, embodiments are not limited to two storage systems but may involve any number of storage systems greater than one. In such cases, the baseline size 144 may be set to the smallest block size across all of the systems.

Figure 2:
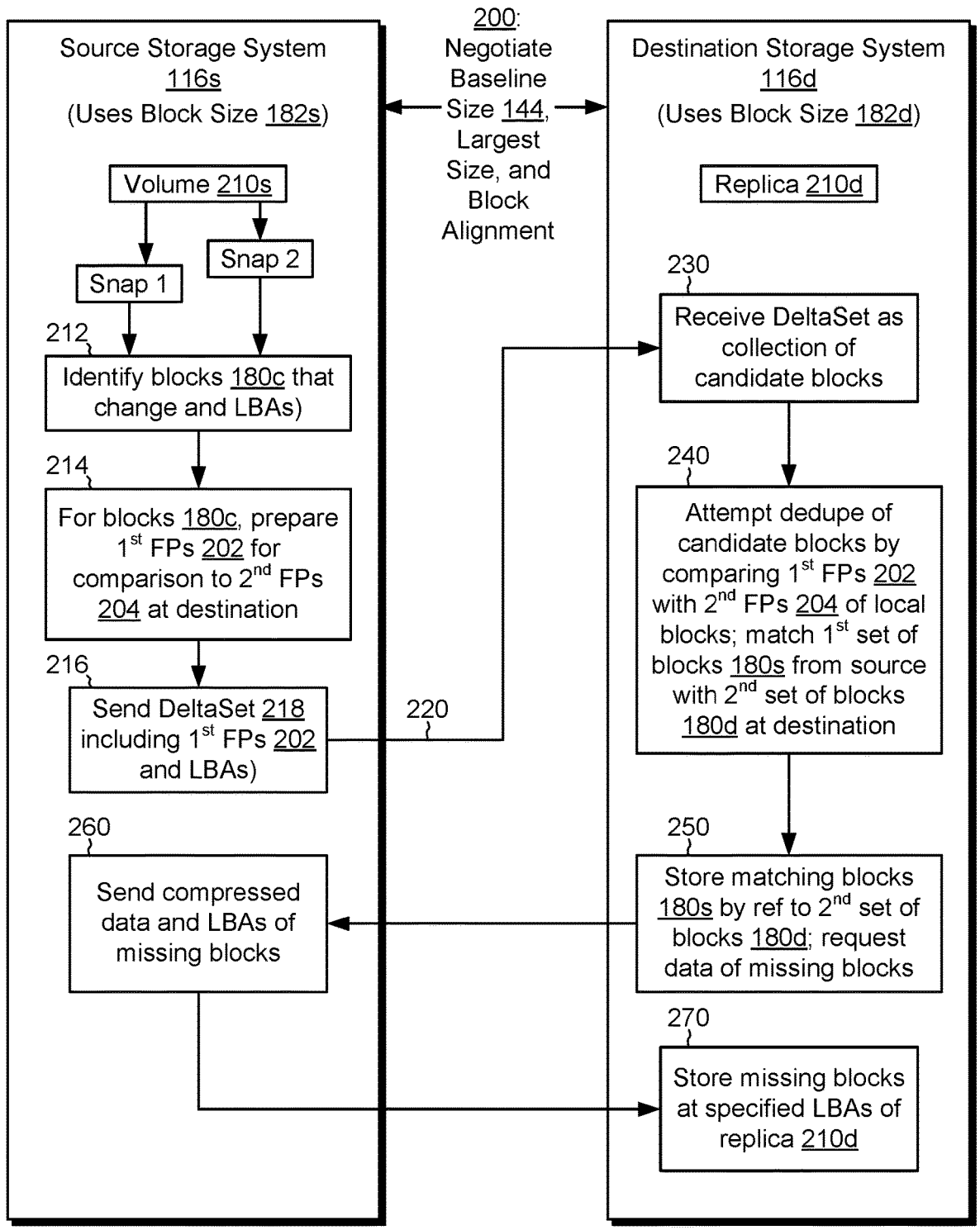
FIG. 2 is a block diagram of an example arrangement for providing data mobility between first and second storage systems having respective block sizes.

FIG. 2 shows an example arrangement for performing fingerprint-based replication between two storage systems 116s and 116d. Storage system 116s is designated as a replication source and has a block size 182s, and storage system 116d is designated as a replication destination and has a block size 182d. The two block sizes 182s and 182d are different from each other.

In an example, a negotiation 200 takes place between the two storage systems 116s and 116d to identify a baseline size 144 for performing fingerprint-based block matching. For example, negotiation 200 may set the baseline size 144 to be the smallest block size 182 between the two systems 116s and 116d. Negotiation 200 may also inform both systems of the largest block size 182 between the two systems. Negotiation 200 may further establish block alignment. For example, if system 116s has a 4-kB block size and system 116d has an 8-kB block size, then system 116s may be configured to provide two blocks starting with an even LBA, for matching with a single block of system 116d. Likewise, if system 116s has an 8-kB block size and system 116d has a 64-kB block size, then system 116s may be configured to provide eight blocks for matching with a single block of system 116d, where the first of the eight blocks has an LBA that is a multiple of eight. Preferably, negotiation 200 takes place in advance of any replication activities, as doing so enables the storage systems 116s and 116d to compute fingerprints in a manner that supports fingerprint-based matching between the two systems.

The example of FIG. 2 depicts snapshot-shipping (asynchronous) replication. Such replication is configured to maintain a replica 210d on the destination 116d of a volume 210s on the source 116s. Both volume 210s and replica 210d are examples of data objects 170, such as those shown in FIG. 1.

Replication proceeds based on snapshots (point-in-time versions) of the volume 210s. For example, a first snapshot (Snap 1) of volume 210s is taken at a first point in time and a second snapshot (Snap 2) of the same volume 210s is taken at a second point in time, which is later than the first point in time. As volume 210s may be a live, production data object, it is expected that Snap 2 differs from Snap 1, with the difference reflecting changes in the volume 210s between the first point in time and the second point in time.

To capture this difference, the source 116s generates a deltaset 218, via acts 212 and 214, which identifies blocks found in Snap 2 but not in Snap 1. Step 212 identifies blocks 180c that change between Snap 1 and Snap 2, e.g., by compiling a list of LBAs of those blocks. The LBAs indicate respective logical addresses of the blocks that change within volume 210s. At step 214, the source 116s prepares first fingerprints 202 of the identified blocks. The first fingerprints 202 are prepared in accordance with the baseline block size 144, as well as the largest block size. In some examples, the first fingerprints 202 are calculated based on attributes found in system metadata associated with the identified blocks 180c. Such metadata may be stored in cache or may be readily accessed from flash drives. In other examples, the first fingerprints 202 are calculated by reading the data of the identified blocks 180c and calculating the fingerprints 202 directly. In an example, the objective of preparing the first fingerprints 202 is to provide a basis of comparison with second fingerprints 204 on the destination system 116d. The resulting deltaset 218 created at the source 116s includes the LBAs of identified blocks 180c and the respective first fingerprints 202. The deltaset 218 does not include the data of the identified blocks, however.

At step 220, the source 116s sends the deltaset 218 to the destination 116d, which receives the deltaset at step 230. At the destination 116d, the deltaset 218 is treated as a collection of candidate blocks for local inline deduplication.

At step 240, the destination 116d attempts to deduplicate the candidate blocks. This step proceeds by attempting to match first fingerprints 202 of the identified blocks 180c in the deltaset 218 with second fingerprints 204 at the destination 116d. The second fingerprints 204 may be stored, for example, in a local digest database 142 on the destination 116d. At the conclusion of step 240, the destination 116d has identified a first set of blocks 180s from the source 116s that match, based on fingerprint comparisons, respective target blocks at the destination. The matching first set of blocks 180s is generally a subset of the identified blocks 180c. The matched-to target blocks are identified herein as a second set of blocks 180d.

At step 250, the destination 116d stores the matching first set of blocks 180s by reference to the second set of blocks 180d. For example, the destination 116d associates the LBA of each matching block of the first set of blocks 180s with a location of the respective matched-to block of the second set of blocks 180d. In this manner, the replica 210d is partially populated with data already found at the destination. Notably, this is accomplished without having to copy the data from source to destination as part of the snapshot-shipping update. Also at step 250, the destination 116d may identify any missing blocks, i.e., blocks of the identified blocks 180c that were not matched at the destination, and sends a list of the missing blocks to the source 116s. The missing blocks may be identified by LBA, for example.

At 260, the source 116s receives the list of missing blocks. The source then gathers the data of the missing blocks and sends the data (preferably compressed) to the destination, along with the associated LBAs.

At 270, the destination receives the missing blocks and stores them in the replica 210d at the indicated LBAs. At this point, the snapshot-shipping update is complete, and the replica 210d matches the volume 210s as of the time of Snap 2. Still to be explained, though, is the manner in which fingerprints 202 and 204 are prepared and compared so as to enable fingerprint-based block matching at the destination 116d.

Figure 3:
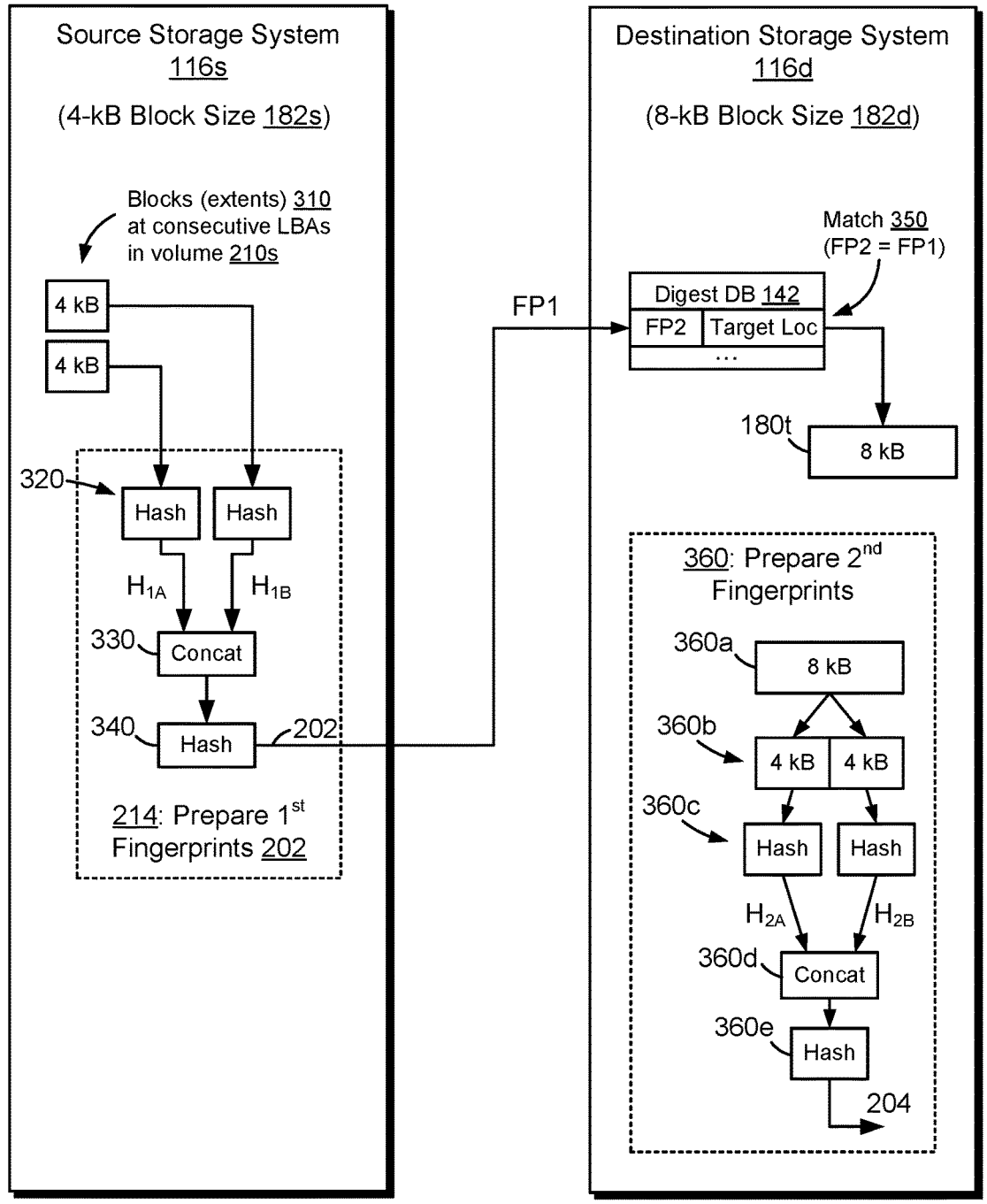
FIG. 3 is a block diagram showing an example of data mobility between first and second storage systems, wherein the first storage system uses a larger block size than the second storage system.
Figure 4:
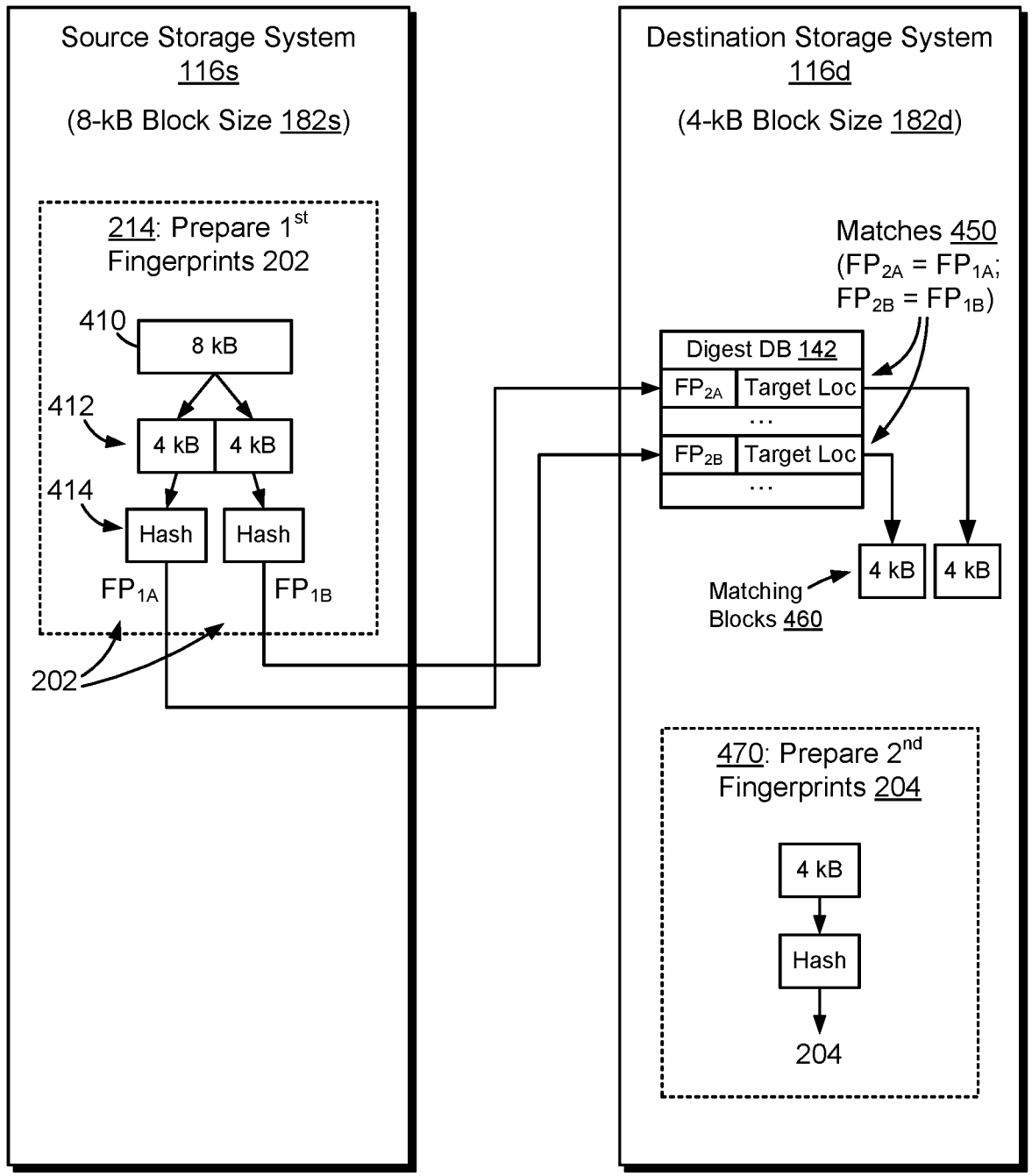
FIG. 4 is a block diagram showing an example of data mobility between first and second storage systems, wherein the first storage system uses a smaller block size than the second storage system.

FIGS. 3 and 4 show detailed examples of fingerprint generation and comparison. FIG. 3 shows an example in which the source has a smaller block size 182 than the destination, and FIG. 4 shows an example in which the source has a larger block size than the destination.

In the example of FIG. 3, the source storage system 116s uses a block size 182s of 4 kB and the destination storage system 116d uses a block size 182d of 8 kB. Given that blocks at the destination are twice as large as blocks at the source, first fingerprints 202 generated at the source are based on pairs of blocks, whereas second fingerprints 204 generated at the destination are based on single blocks. The two blocks in each pair have consecutive LBAs in volume 210s. Each pair is also chosen for proper alignment with a respective single block at the destination. For example, a pair of blocks used to generate a first fingerprint 202 may start at an even LBA (zero-based) in volume 210s.

An example procedure of generating a first fingerprint 202 at the source 116s starts with two blocks 310 having consecutive LBAs in volume 210s. As shown by arrow 320, the two blocks 310 are individually hashed to produce respective hash values, $H_{1A}$ and $H_{1B}$. The resulting hash values are then combined to yield a first fingerprint 202. In an example, combining the two hash values $H_{1A}$ and $H_{1B}$ includes concatenating the two hash values (330) and hashing the result (340). In an example, the same hash function is used for all three hashing operations shown, and that hash function may be the same one that the source 116a normally uses for deduplication. It is not required that all three hash functions be identical, however. Also, the order in which hash values $H_{1A}$ and $H_{1B}$ are concatenated is not critical, but a particular order is preferably selected and used consistently.

Figure 5:
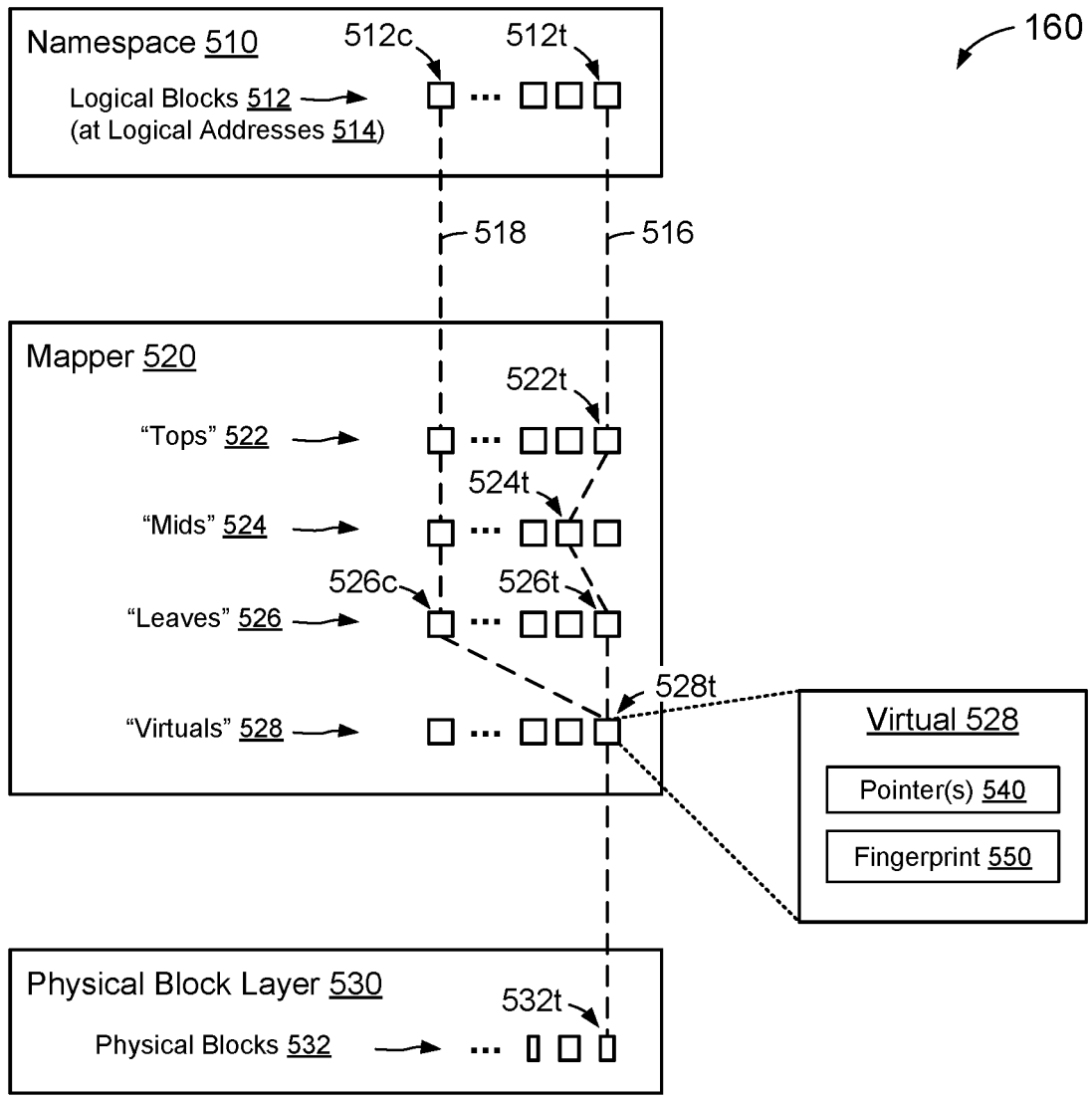
FIG. 5 is a block diagram showing an example data path of FIG. 1 in additional detail.

In many cases, hash values $H_{1A}$ and $H_{1B}$ are computed in advance. For example, $H_{1A}$ and $H_{1B}$ may be the same hash values that the source 116s uses for deduplication. These hash values may be stored in system metadata, such as in virtual block metadata associated with blocks 310 (FIG. 5). Such metadata may be cached or may be otherwise available from high-speed storage (e.g., flash). Thus, hash values $H_{1A}$ and $H_{1B}$ may generally be obtained from metadata and without having to read the actual data of blocks 310. In this manner, generating a first fingerprint 202 simply involves accessing the hash values $H_{1A}$ and $H_{1B}$ from metadata, concatenating $H_{1A}$ with $H_{1B}$, and hashing the result. Such activities are not overly burdensome to a storage system. Also, the activities shown are performed only for the blocks 180c identified in a deltaset 218 (FIG. 2).

At the destination 116d, the first fingerprint 202 is received (e.g., in a deltaset 218) and processed for local deduplication. For example, the destination 116d performs a lookup in local digest database 142 for a second fingerprint 204 that matches the received first fingerprint 202. In order to support fingerprint-based block matching, second fingerprints 204 used in the digest database 142 at the destination 116d are prepared in a particular manner, which corresponds to the manner in which first fingerprints 202 are created at the source.

Section 360 of FIG. 3 shows an example method of preparing second fingerprints 204 for blocks at the destination. As shown, an 8-kB block 360*a* is rendered as a pair of extents 360*b*, where the size of each extent is the baseline size 144, i.e., 4 kB in this example. At 360*c*, each of the extents 360*b* is respectively hashed to produce respective hash values, $H_{2A}$ and $H_{2B}$. The hash values are concatenated (at 360*d*), and the result of concatenation is hashed at 360*e* to provide a second fingerprint 204. The hash functions shown at 360*c* and 360*e* are preferably the same, respectively, as the hash functions used at 320 and 340 at the source 116*s*. Thus, the method of generating the second fingerprint 204 at the destination is the same as the method of generating the first fingerprint 202 at the source and will produce the same results for the same data.

Preferably, the destination 116*d* performs the depicted acts of section 360 in advance of the replication activities described, such that the digest database 142 at the destination natively stores its fingerprints as second fingerprints 204. For example, the depicted activities are performed as part of normal block processing at the destination, e.g., upon data ingest when blocks are initially received. Thus, fingerprints stored in the digest database 142 at the destination are computed as second fingerprints 204, such that the second fingerprints 204 are already present and waiting to be compared with first fingerprints 202. Notably, computing fingerprints 204 in this manner at the destination 116*d* makes the fingerprints 204 suitable for local deduplication at the destination. Thus, second fingerprints 204 at the destination are useful not only for replication with the source 116*s* but also for local deduplication within the destination.

One should appreciate that the procedures for generating first and second fingerprints 202 and 204 are readily scalable for different block sizes. For instance, if the block size 182*d* at the destination were 64 kB instead of 8 kB, the procedure for generating first fingerprints 202 at the source would involve sixteen contiguous 4-kB blocks, rather than two, with each 4-kB block being individually hashed, with the resulting hash values being concatenated, and with the result of concatenation being hashed to produce a first fingerprint 202. Likewise, at the destination a 64-kB block would be rendered as sixteen extents (rather than two). The sixteen extents would be individually hashed, the hash values would be concatenated, and the result of concatenation would be hashed to yield a second fingerprint 204.

FIG. 4 shows another example approach for generating fingerprints 202 and 204, but this time the source 116*s* has the larger block size (8 kB), as compared with a block size of 4 kB at the destination 116*d*. At the source 116*s*, first fingerprints 202 are prepared from an 8-kB block 410 by rendering the block as extents 412, where each extent has the baseline size 144 (4 kB). As indicated by arrow 414, each extent is individually hashed to generate respective first fingerprints 202, i.e., $FP_{1A}$ and $FP_{1B}$.

At the destination 116*d*, respective lookups are performed into the digest database 142, one for $FP_{1A}$ and another for $FP_{1B}$. If both lookups result in matches 450, then the 8-kB block at the source is successfully matched with a pair of 4-kB blocks 460 at the destination. Storage of the data of the 8-kB block 410 at the destination can then be achieved by pointing the LBA corresponding to block 410 in the replica 210*d* to the matching target blocks 460. It is not necessary to transmit the actual data of block 810 from source to destination as part of this operation.

Section 470 shows an example arrangement for preparing second fingerprints 204 at the destination, so that the second fingerprints 204 may be successfully matched with first fingerprints 202 from the source. Here, a second fingerprint 204 is provided simply as a hash of a 4-kB (extent-sized) block. Thus, nothing unusual is needed for preparing the second fingerprints 204, which may be calculated in the conventional way.

Scalability can also be achieved easily in the FIG-4 arrangement. For example, if the block size 182*s* at the source were 64 kB instead of 8 kB, then a 64-kB block would be rendered as sixteen 4-kB blocks, which would be individually hashed at the source to produce sixteen first fingerprints 202. At the destination 116*s*, sixteen separate lookups would be performed into the digest database 142, one lookup for each first fingerprint 202. If all lookups were to produce matches with local target blocks, then the data of the original 64-kB block could be stored by reference to the sixteen target blocks.

FIG. 5 shows an example of the data path 160 of FIG. 1 and provides an example of how one data block may be stored by reference to another data block in a destination storage system 116*d*. The data path 160 provides an arrangement of metadata in the form of metadata elements, such as pointers, which may be traversed for locating data in the storage system 116*d* and for supporting deduplication. As shown, the data path 160 includes a namespace 510, a mapping structure ("mapper") 520, and a physical block layer 530. The namespace 510 is configured to organize logical data, such as data of volumes, file systems, virtual machine disks, snapshots, clones, and/or the like. In an example, the namespace 510 provides a large logical address space and is denominated in logical blocks 512 having associated logical addresses 514.

The mapper 520 is configured to map logical blocks 512 in the namespace 510 to corresponding physical blocks 532 in the physical block layer 530. The physical blocks 532 are normally compressed and may thus have non-uniform size. The mapper 520 may include multiple levels of mapping structures, such as pointers, which are arranged in a tree. The levels include tops 522, mids 524, and leaves 526, which together are capable of mapping large amounts of data. The mapper 520 may also include a layer of virtuals 528, i.e., block virtualization structures for providing indirection between the leaves 526 and physical blocks 532, thus enabling physical blocks 532 to be moved without disturbing leaves 526. Although the tops 522, mids 524, leaves 526, and virtuals 528 depict individual pointer structures, such pointer structures may be grouped together in arrays (not shown), which themselves may be stored in blocks.

In general, logical blocks 512 in the namespace 510 point to respective physical blocks 532 in the physical block layer 530 via mapping structures in the mapper 520. For example, a logical block 512*t* in the namespace 510 may point, via a path 516, to a particular top 522*t*, which points to a particular mid 524*t*, which points to a particular leaf 526*t*. The leaf 526*t* points to a particular virtual 528*t*, which points to a particular physical block 532*t*. In this manner, the data corresponding to logical block 512*t* may be found by following the pointers through the mapper to the data 532*t*.

FIG. 5 also shows an example virtual 528 in greater detail. Here, the virtual 528 is a metadata element that includes a pointer 540 to the data (e.g., to block 532*a*) as well as a hash value 550 of the data of logical block 512*t*. In an example, the hash value 550 provides a fingerprint used by a local digest database 142 for supporting fingerprint-based block matching. Thus, in the example of FIG. 3, hash values 550 of respective logical blocks 310 may store values $H_{1A}$ and $H_{1B}$, making such hash values readily available for computing first fingerprints 202. One should appreciate that the virtual 528 may include other metadata besides that shown, such as a reference count, a compressed size of the pointedto physical block, and the like. The virtual 528 as shown is thus intended to be illustrative rather than limiting.

FIG. 5 further shows an example arrangement for supporting deduplication. For instance, a candidate block 512*c* may be deduplicated by reference to the above-mentioned block 512*t*, which is designated here as a target block. As shown, logical block 512*c* has its own path 518 through the mapper 520, but the leaf 526*c* in the path 518 points to the virtual 528*t*, the same virtual that was in path 516. Thus, deduplication can be achieved at the leaf level by pointing different blocks to the same virtual 528. For example, storage of the candidate block 512*c* can be effectuated by reference to the target block 512*t*, e.g., by establishing a pointer in the leaf 526*c* so that it points to the virtual 528*t*.

Although FIG. 5 depicts an example data path 160 that supports storage by reference, one should appreciate that such storage can be achieved in a variety of ways, the particulars of which are not critical to this disclosure. Thus, the data path 160 of FIG. 5 is intended to be illustrative rather than limiting.

Figure 6:
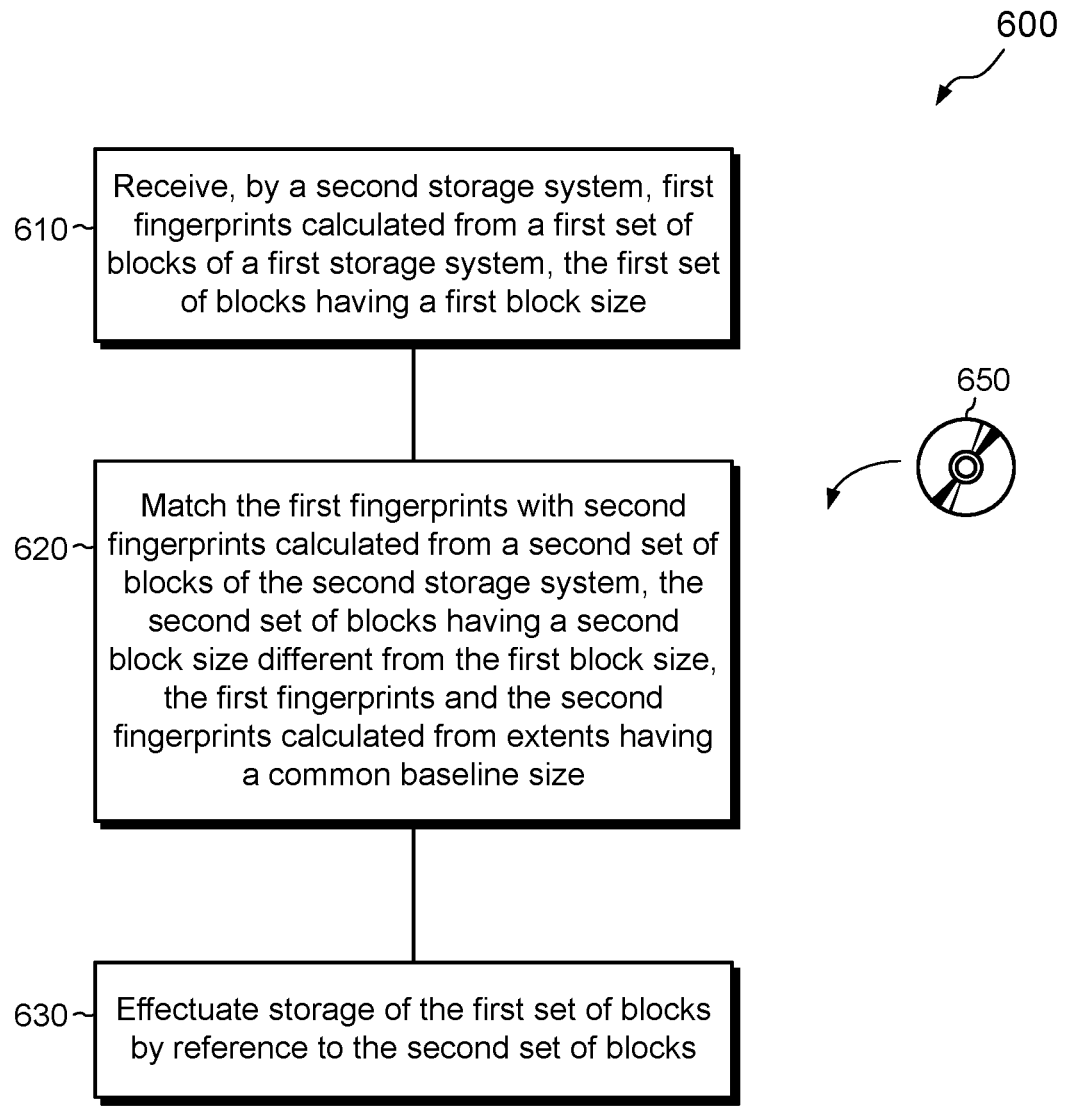
FIG. 6 is a flowchart showing an example method of managing data mobility between storage systems having respective block sizes.

FIG. 6 shows an example method 600 of managing data mobility between storage systems having respective block sizes and provides an overview of some of the features presented above. The method 600 may be carried out in connection with the environment 100 and is typically performed, for example, by the software constructs described in connection with FIG. 1, and may involve activities among two data storage systems 116 having different respective block sizes. The various acts of method 600 may be ordered in any suitable way. Accordingly, embodiments may be constructed in which acts are performed in orders different from that illustrated, which may include performing some acts simultaneously.

At 610, a second storage system 116*d* receives first fingerprints 202 calculated from a first set of blocks 180*s* of a first storage system 116*s*, the first set of blocks 180*s* having a first block size 182*s*.

At 620, the first fingerprints 202 are matched with second fingerprints 204 calculated from a second set of blocks 180*d* of the second storage system 116*d*. The second set of blocks 180*d* has a second block size 182*d* different from the first block size 182*s*. The first fingerprints 202 and the second fingerprints 204 are calculated from extents (e.g., 310 and 360*b*, or 412 and 460) having a common baseline size 114.

At 630, storage of the first set of blocks 180*s* is effectuated by reference to the second set of blocks 180*d*, e.g., in the manner shown in FIG. 5.

An improved technique has been described for achieving data mobility between storage systems 116 having different block sizes 182. The technique includes identifying a baseline size 114 that is common to the block sizes 182 of the storage systems 116. The technique further includes generating fingerprints 202 and 204 of blocks 180 based on extents (e.g., 310 and 360*b*, or 412 and 460) having the common baseline size 114. Fingerprint-based data mobility is then achieved by comparing extent-based fingerprints 202 and 204, or combinations thereof, across different storage systems 116 to identify matching data. Advantageously, the improved technique enables fingerprint-based matching to proceed when sending data between storage systems having different block sizes, thereby reducing network traffic and congestion. The technique also promotes effective data management in heterogenous storage environments, as it overcomes an impediment to data mobility between systems of different block sizes.

Having described certain embodiments, numerous alternative embodiments or variations can be made. For example, although embodiments have been described that involve snapshot-shipping replication, embodiments may be constructed using other modalities of data mobility, such as data migration and other forms of replication. Indeed, the instant disclosure applies to any technology that transmits data blocks from one storage system to another.

Further, although data mobility has been described above as applying to volumes, such as volume 210*s*, data mobility in accordance with this disclosure is not limited to volumes. Rather, such data mobility may be applied with any type of data object 170, such as volumes, LUNs, file systems, virtual machine disks, and the like.

Further, although some embodiments have been described in which a larger block on a source system is matched with multiple smaller blocks on a destination system (FIG. 4), embodiments may also be constructed in which only partial matches occur. For example, if only one of the extents 412 at the source is successfully matched with a target block 460 at the destination, the matching extent may be stored by reference to the target block and the missing extent can then be retrieved separately from the source (e.g., in step 250 of FIG. 2).

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing data mobility between storage systems having respective block sizes, comprising:
    receiving, by a second storage system, first fingerprints calculated from a first set of blocks of a first storage system, the first set of blocks having a first block size;
    matching the first fingerprints with second fingerprints calculated from a second set of blocks of the second storage system, the second set of blocks having a second block size different from the first block size, the first fingerprints and the second fingerprints calculated from extents having a common baseline size assigned as a smallest block size of the first block size and the second block size; and
    effectuating storage of the first set of blocks by reference to the second set of blocks,
    wherein the second block size is larger than the first block size, and wherein the method further comprises generating a second fingerprint of the second fingerprints by (i) generating multiple hash values from respective extents of a block of the second set of blocks and (ii) combining the multiple hash values into a single hash value.

2. The method of claim 1, wherein combining the multiple hash values into the single hash value includes (i) concatenating together the multiple hash values and (ii) generating a hash of the concatenated hash values.

3. The method of claim 1, wherein matching the first fingerprints with the second fingerprints includes comparing the second fingerprint with a first fingerprint of the first fingerprints, the first fingerprint generated from multiple blocks of the first set of blocks.

4. A method of managing data mobility between storage systems having respective block sizes, comprising:
    receiving, by a second storage system, first fingerprints calculated from a first set of blocks of a first storage system, the first set of blocks having a first block size;
    matching the first fingerprints with second fingerprints calculated from a second set of blocks of the second storage system, the second set of blocks having a second block size different from the first block size, the first fingerprints and the second fingerprints calculated from extents having a common baseline size assigned as a smallest block size of the first block size and the second block size; and
    effectuating storage of the first set of blocks by reference to the second set of blocks,
    wherein the second block size is smaller than the first block size, wherein receiving the first fingerprints includes obtaining multiple hash values of respective extents of a single block of the first set of blocks.

5. The method of claim 4, wherein matching the first fingerprints with the second fingerprints includes comparing the multiple hash values with respective fingerprints of the second fingerprints.

6. The method of claim 4, wherein assigning the baseline block size is based on a negotiation between the first storage system and the second storage system.

7. The method of claim 6, further comprising establishing, based on the negotiation, an alignment between the first set blocks and the second set of blocks.

8. The method of claim 4, further comprising calculating the second fingerprints prior to receiving the first fingerprints.

9. A method of managing data mobility between storage systems having respective block sizes, comprising:
    sending, by a first storage system to a second storage system, first fingerprints calculated from a first set of blocks of the first storage system, the first set of blocks having a first block size;
    matching, by the second storage system, the first fingerprints with second fingerprints calculated from a second set of blocks of the second storage system, the second set of blocks having a second block size different from the first block size, the first fingerprints and the second fingerprints calculated from extents having a common baseline size assigned as a smallest block size of the first block size and the second block size; and
    effectuating, by the second storage system, storage of the first set of blocks by reference to the second set of blocks,
    wherein the second block size is larger than the first block size, and wherein the method further comprises generating a second fingerprint of the second fingerprints by (i) generating multiple hash values from respective extents of a block of the second set of blocks and (ii) combining the multiple hash values into a single hash value.

10. The method of claim 9, wherein combining the multiple hash values into the single hash value includes (i) concatenating together the multiple hash values and (ii) generating a hash of the concatenated hash values.

11. The method of claim 10, wherein matching the first fingerprints with the second fingerprints includes comparing the second fingerprint with a first fingerprint of the first fingerprints, the first fingerprint generated from multiple blocks of the first set of blocks.

12. The method of claim 9, further comprising generating, by the first storage system, a first fingerprint of the first fingerprints at least in part by (i) generating multiple hash values from respective blocks of the first set of blocks and (ii) combining the multiple hash values into a single hash value.

13. The method of claim 9, wherein the second block size is smaller than the first block size, wherein receiving the first fingerprints includes obtaining multiple hash values of respective extents of a single block of the first set of blocks.

14. The method of claim 13, wherein matching the first fingerprints with the second fingerprints includes comparing the multiple hash values with respective fingerprints of the second fingerprints.

15. The method of claim 13, further comprising generating the first fingerprint by (i) accessing a block of the first set of blocks, (ii) rendering the block as multiple extents having the common baseline size, (iii) calculating respective hash values from the multiple extents, and (iv) combining the hash values.

16. The method of claim 9, wherein assigning the baseline block size is based on a negotiation between the first storage system and the second storage system.

17. The method of claim 16, further comprising establishing, based on the negotiation, an alignment between the first set blocks and the second set of blocks.

18. The method of claim 9, further comprising calculating the second fingerprints prior to receiving the first fingerprints.

* * * * *